May 28, 1935. G. MAIURI 2,002,958

ABSORPTION REFRIGERATING APPARATUS AND METHOD

Filed Feb. 25, 1928

Inventor.
Guido Maiuri.
By B. Singer, Atty.

Patented May 28, 1935

2,002,958

UNITED STATES PATENT OFFICE 2,002,958

ABSORPTION REFRIGERATING APPARATUS AND METHOD

Guido Maiuri, London, England, assignor, by mesne assignments, to Electrolux Servel Corporation, a corporation of Delaware Application February 25, 1928, Serial No. 256,993
In Great Britain February 25, 1927

11 Claims. (Cl. 62—119.5)

My invention relates to refrigerating apparatus of the absorption type wherein a refrigerant evaporating in the presence of an inert gas undergoes absorption only and not condensation, the liquor having four different degrees of concentration.

According to my invention I arrange the parts of such known systems so that a connected circulation of the liquor is obtained, through an evaporator, a generator, and absorbers in series while different rates of flow are obtained in different parts in correlation to action of the parts.

With my machine I obtain an efficiency greater than that of known apparatuses of this general type.

In the accompanying drawing

Figure 1:
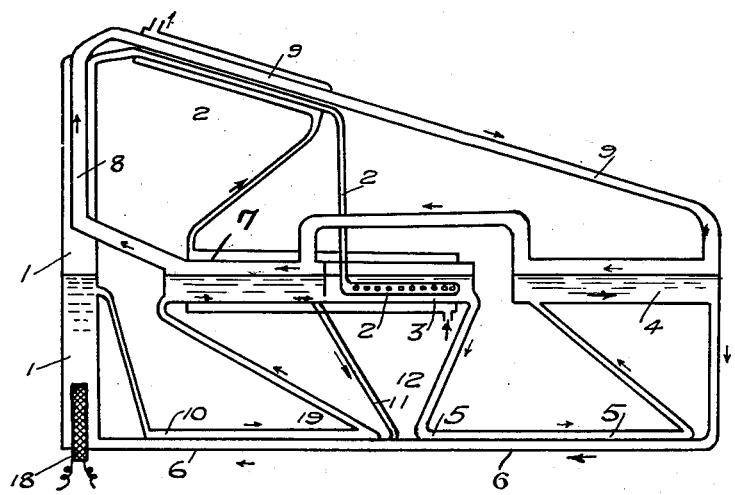
Figure 1 is a diagrammatic view of apparatus illustrating my invention.

My apparatus, as shown in Figure 1, is composed of a boiler 1, (otherwise commonly termed a generator), heated by an electric heater 18, in which boiler the refrigerant vapor for example, ammonia, is evaporated from the liquor or solution giving anhydrous ammonia at an elevated temperature (for example, 70–120° C.), the ammonia vapor, cooled by water circulation, passing by a pipe 2 into an absorber 3 in which it is absorbed substantially at the temperature of the cooling water, (for example, 20° C.). The very strong or rich liquor (comprising the solution of absorption liquid, which may be water, with the refrigerant dissolved therein) which is obtained in the absorber 3 passes through a conduit 5 into an evaporator or refrigerator 4 (in heat exchange relation with and which absorbs heat from the body to be cooled) in which the ammonia and also some of the water is evaporated from the strong liquor at a low temperature (10° C. or less), and at low partial pressure, the complement of pressure being given by an inert gas, as in the Geppert machine (British Patent 13,875 of 1899) and other machines of similar type.

Figure 2:
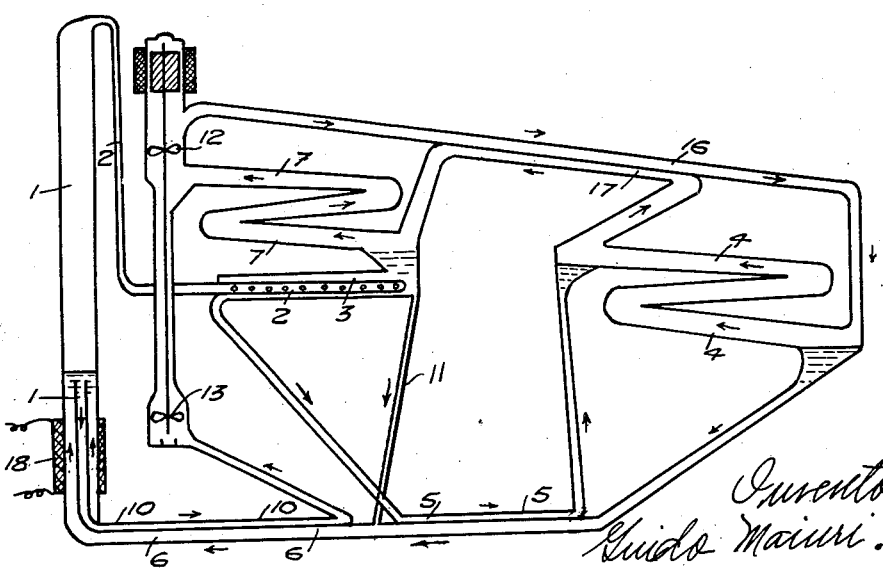
Figure 2 is a similar view of a slightly different form of apparatus embodying the invention.

The ammonia vapor which is freed in the evaporator 4 diffuses into the inert gas, which carries it to be re-absorbed in another or second absorber 7 at substantially the temperature of the cooling water. To obtain the said evaporation and absorption, the inert gas is submitted to a forced circulation, effected by heating the gas in a pipe 8 and cooling it in a pipe 9, or by means of a fan 12 (Fig. 2). The liquor from the evaporator 4 passes into the boiler 1 through a conduit 6 which is in part in heat exchange relation with conduit 5. The weak liquor from the boiler 1 returns to the absorber 7 through a conduit 10 in part in heat exchange relation with conduit 6. The two absorbers 3 and 7 are in intercommunication beneath the liquid level in both.

This apparatus has circulation of liquid by thermosiphonic action, either ordinary or accelerated, from the boiler 1 to the second absorber 7, from the absorber 7 to the first absorber 3, in which latter the liquor is supersaturated with the ammonia coming from the boiler 1, and from the absorber 3 to the evaporator 4 (which latter may be considered as a second boiler working at low temperature).

Since the two absorbers 3 and 7 are at the same temperature and the liquid passes from one to the other, it is possible to unite them in one vessel, the two absorber spaces being connected for flow of liquid, but separated with respect to the gas spaces thereof. The liquid will thus flow from one absorber, through the communication between the two and to the other absorber, and will be gradually enriched in its passage toward the evaporator 4.

From the evaporator 4 the liquor returns to the boiler 1 through conduit 6, and the weak liquor from the boiler 1 passes to the absorber 7, being heated in the heat exchanger 10, 6 by the solution passing to the boiler.

The circulation of the inert gas can be obtained, as shown in Figure 1, by heating the said gas in the pipe 8 by heat from the ammonia vapor freed in the boiler 1, in other words without any additional source of heat.

In this apparatus, the ammonia liquor is at four different concentrations, which depend upon and can be selected by the initial charge, and by varying the various dimensions of the apparatus.

In this way it is easy to understand that I am not bound to any particular working pressures as in ordinary machines with liquefaction of ammonia, in which the pressure is dependent on the temperature of the available cooling water, and on the dimensions of the condenser.

In my machine, on the contrary, I can have a solution in the boiler which evaporates ammonia at 80° C. and at 1 atm. absolute, the solution becoming weakened to a maximum.

On the other hand, in the evaporator, I can have a solution so concentrated as to evaporate at a low temperature, and a partial pressure which is but a small fraction of 1 atm.

I can even construct an apparatus in which the air which naturally fills the apparatus can be left therein to serve as the inert gas, or such air can be expelled by introducing another gas such as helium, hydrogen, nitrogen, argon or any other gas having no action (i. e. inert) on water, ammonia, and the metal composing the machine.

Apparatuses filled in this manner can be made to work at any desired pressure by proportioning only the volumes of the boiler and the first absorber, in relation to the volumes of the second absorber and of the evaporator.

In order to have a more intense circulation between the absorber 7 and the boiler 1 than between the absorber 3 and the evaporator 4, a shunt pipe 11 is provided, interconnecting the absorber 7 and the conduit 6 between the pipes 10 and 5. This shunt pipe 11 causes an augmentation of circulation in the circuit 1—10—7—6 and a corresponding diminution of circulation in the circuit 1—10—5—4—6.

Figure 2 shows an apparatus in which the circulation of the inert gas is accelerated by an internally driven fan 12 and the circulation of the liquid is promoted by an impeller 13 on the same shaft as in the application for Letters Patent of the United States, Serial No. 256,994 of even date herewith.

The inert gas passes in contra-flow through a heat exchanger 16, 17, before arriving in the evaporator 4.

The boiler in Figure 2 is heated electrically by means of a resistance 18.

An advantage of having the circulation of the liquor as above described is the ability of recuperating heat to a maximum in the heat exchangers, owing to there being approximately no interruption in the progressive increase of temperature to which the liquor in the exchanger element 6 is exposed and the ability to correlate the expulsion of refrigerant to the evaporation of refrigerant.

What I claim is:—

1. Refrigerating apparatus comprising a generator, a first absorber, a second absorber, an evaporator, means to circulate absorption liquid containing refrigerant in series through the generator, second absorber, first absorber and evaporator in the order last named, means to circulate an auxiliary medium in the presence of which the refrigerant evaporates through the evaporator and the second absorber, means to conduct vapor from the generator to the first absorber, and means to circulate absorption liquid from the generator to the second absorber and back to the generator without passing through the evaporator.

2. Refrigerating apparatus comprising a generator, an evaporator, a first absorber, a second absorber, thermosiphon circulating means including conduits connecting the aforesaid members for circulating absorption liquid through all of said members in series, and a shunt conduit whereby part of the absorption liquid circulates only through the generator and the second absorber.

3. Refrigerating apparatus comprising a plurality of heat absorption vessels and a plurality of heat rejection vessels, conduits for circulating absorption liquid through all of said vessels in series, and a shunt conduit whereby part of the absorption liquid circulates only through one heat absorption vessel and one heat rejection vessel.

4. The method of producing refrigeration which comprises absorbing refrigerant vapor in absorption liquid to form a rich solution, introducing the rich solution into the presence of an inert gas to expel refrigerant from the solution into the inert gas and forming refrigerant-rich inert gas, conducting the solution from the presence of the inert gas into heat exchange relation with a source of heat, heating the solution to expel refrigerant vapor and produce weak solution, conducting the weak solution and the refrigerant-rich inert gas into the presence of each other to partially enrich the solution, returning the inert gas into the presence of the rich solution, conducting a part of the partially enriched solution into the presence of the refrigerant vapor expelled by heat to again form rich solution, and conducting the remainder of the partially enriched solution back to heat exchange relation with the source of heat.

5. The method of producing refrigeration which comprises absorbing refrigerant vapor in absorption liquid to form a rich solution, introducing the rich solution into the presence of an inert gas to expel refrigerant from the solution into the inert gas and forming refrigerant-rich inert gas, conducting the solution from the presence of the inert gas into heat exchange relation with a source of heat, heating the solution to expel refrigerant vapor and produce weak solution, conducting the weak solution and the refrigerant-rich inert gas into the presence of each other to partially enrich the solution, returning the inert gas into the presence of the rich solution, conducting a part of the partially enriched solution into the presence of the refrigerant vapor expelled by heat to again form rich solution, conducting the remainder of the partially enriched solution back to heat exchange relation with the source of heat, and transferring heat from the weak solution and the rich solution into the solution passing to the source of heat.

6. Refrigerating apparatus comprising a plurality of heat absorption vessels and a plurality of heat rejection vessels containing absorption liquid, means to circulate some absorption liquid through all of said vessels in series and means to circulate some of the absorption liquid only through less than the total number of heat absorption vessels and less than the total number of heat rejection vessels.

7. Refrigerating apparatus comprising two heat absorption vessels and two heat rejection vessels containing absorption liquid, and thermosiphon means including conduits connecting the aforesaid vessels to circulate some absorption liquid through all of said vessels in series and to circulate some of the absorption liquid only through one of the heat absorption vessels and one of the heat rejection vessels.

8. In a cycle of refrigeration including the evaporation from solution into inert gas, absorption therefrom, generation, and reabsorption of refrigerant fluid, in which cycle absorption liquid is circulated through said portions thereof in series, that improvement which comprises circulation of additional absorption liquid through the absorption and generation portions of said cycle independently of the evaporation portion.

9. In a cycle of refrigeration including the evaporation from solution into inert gas, absorption therefrom, generation, and reabsorption of refrigerant fluid, in which cycle absorption liquid is circulated through said portions thereof in series, that improvement which comprises circulation of absorption liquid through the absorption and generation portions of said cycle at a greater rate of speed than through the evaporation and reabsorption portions.

10. In a cycle of refrigeration including the evaporation from solution into inert gas, absorption therefrom, generation, and reabsorption of refrigerant fluid, in which cycle absorption liquid is circulated through said portions thereof in series, that improvement which comprises flowing more absorption liquid through the generation and absorption portions of said cycle than through the evaporation portion.

11. In a cycle of refrigeration including the evaporation from solution into inert gas, absorption therefrom, generation, and reabsorption of refrigerant fluid, in which cycle absorption liquid is circulated through said portions thereof in series, that improvement which comprises shunting a part of the absorption liquid around said evaporation portion.

GUIDO MAIURI.